Patented Oct. 3, 1950

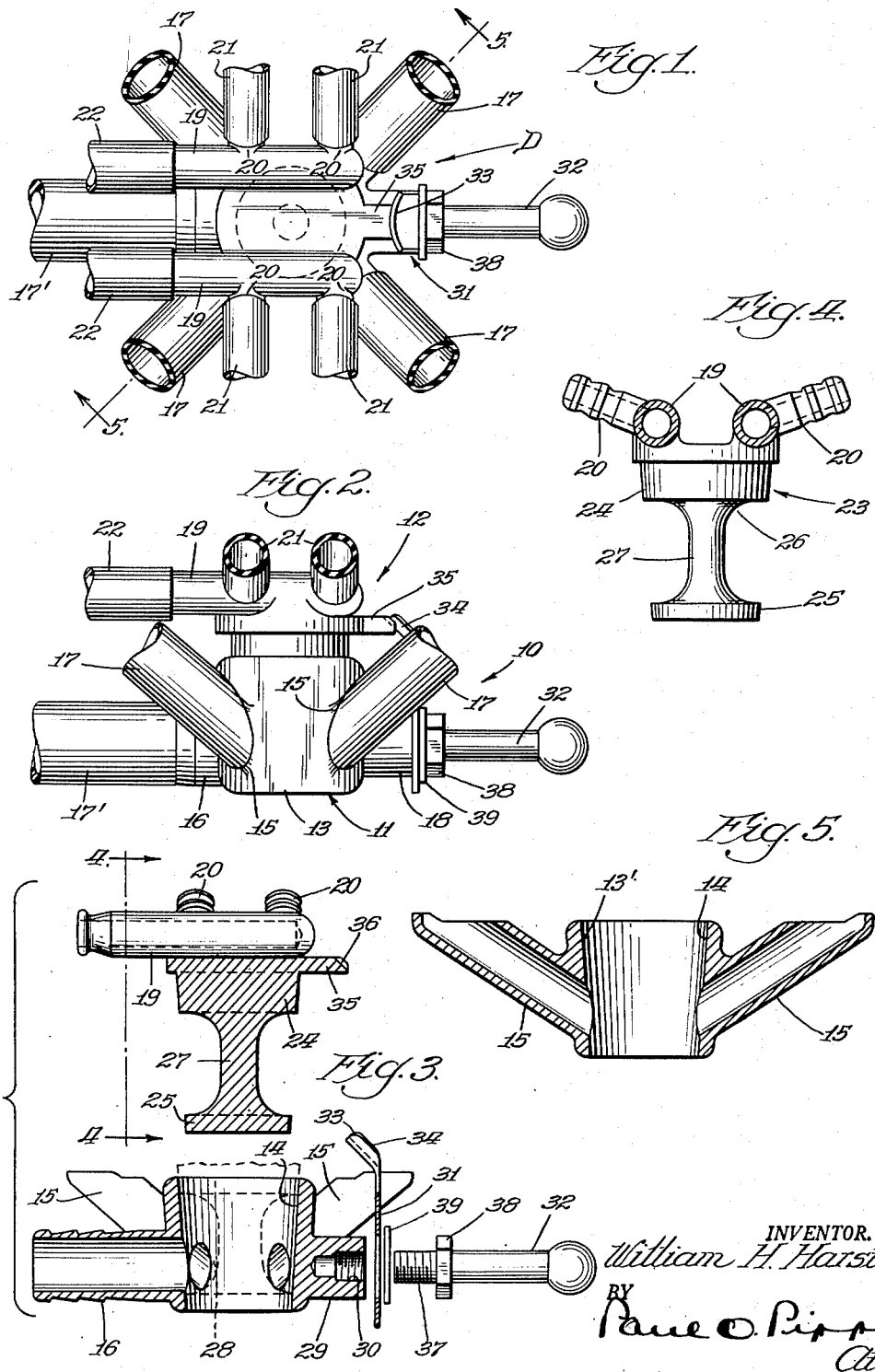

2,524,193

UNITED STATES PATENT OFFICE 2,524,193

TEAT CUP CLAW

William H. Harstick, Oak Park, Ill., assignor to International Harvester Company, a corporation of New Jersey Application June 20, 1947, Serial No. 755,991

5 Claims. (Cl. 31—83)

This invention relates to a coupling device for connecting a plurality of conduits, and more particularly it relates to a teat cup claw for use with a milking apparatus. More specifically, this invention relates to a two piece teat cup claw.

In the handling of dairy animals it is extremely necessary that the milking machine operator take great care with the removal of the teat cups from the teats of the cow. Any unusual or heavy pull on the teats of the cow could produce udder irritation resulting in lowered milk production.

After milking, the operator shuts off the vacuum going to the teat cups and prepares to remove the cups from the teats of the animal. At this point, however, a certain amount of vacuum still remains in the milk hose leading from the milker pail to the claw and up to the teat cups. In the past, the operator merely used force to pull the teat cups from the teats of the animal. In view of the vacuum remaining in the milker line, the teats of the animal were subjected to an unusually heavy pull and this action soon resulted in irritation to the tender portions of the cow's udder, thus causing undesirable results. Applicant has provided a milker claw which can easily be manipulated by the operator so that the milk hose is momentarily exposed to the atmosphere, thus destroying the vacuum therein, and permitting the removal of the teat cups without the necessity of using force to pull them from the teats of the cow.

Another of the problems confronting the dairy industry, and especially the dairy farmer, is the problem of keeping milk pure and free from contamination. As a result therefore it is necessary that the parts of a milking apparatus be immediately cleaned and kept in a sanitary storage place after cleaning. Great difficulty has been experienced in the cleaning of milker claws because of the varied designs of the milk passages and the inability of the operator to pass a cleaning brush throughout all the parts of the claw. Applicant has seen the need for a sanitary milker claw that can quickly and effectively be cleaned and has developed a novel design which meets this demand.

The prime object of this invention is to provide a two piece teat cup claw which may quickly be taken apart for cleaning.

Another object is to provide a milker claw for a milking apparatus, said claw having milk passages in which a vacuum may be provided, said claw also embodying means whereby an operator may quickly destroy the vacuum in said passages by manipulating parts of said claw to expose said passages to the atmosphere.

Another object is to provide a two piece teat cup claw that can readily be taken apart and wherein the surfaces of the passages of the claw are completely visible when it is taken apart for inspection and cleaning.

Still another object is to provide a two piece teat cup claw wherein the milk passages extend radially outwardly from a central bore, said bore cooperating with a plug shaped member which is readily removable from the bore for cleaning purposes, thereby facilitating the cleaning of the milk passages.

A still further object is to provide a teat cup claw having milk conduits in communication with a central bore which is so arranged that a cleaning brush can readily be passed through all the passages of the conduits.

Still another object is to provide a two piece teat cup claw having improved means for holding the pieces of said claw in unitary relationship, said means being quickly adjustable to permit the separation of said pieces for cleaning purposes.

A further object is to provide a teat cup claw having first and second body portions, one of said body portions having a tapering projection, the other body portion having a tapering bore for receiving said projection in wedged or mating interfitting relation, and resilient means for retaining said parts in said relation, said resilient means being readily adjustable to permit separation of said body members.

Other objects of this invention will become apparent from a reading of the following description when examined in conjunction with the drawing.

In the drawing:

Figure 1 is a plan view of a teat cup claw showing a plurality of flexible hoses leading thereto.

Figure 2 is a side elevational view of the same.

Figure 3 is an exploded sectional view of the teat cup claw showing the manner in which the pieces of the claw may be taken apart.

Figure 4 is a sectional view taken along the line 4—4 of Figure 3.

Figure 5 is a sectional view taken along the line 5—5 of Figure 1.

A two piece teat cup claw is generally designated by the reference character 10. The teat cup claw 10 consists of a first body member 11 and a second body member 12.

The first body member 11 includes a vertically extending central member 13 having a vertical tapering bore 13'. The vertical tapering bore 13' forms an inner tapering or conical wall 14. A plurality of milk passages or conduits 15 extend radially outwardly from the member 12 and are in communication with the vertical bore 13. A main milk conduit 16 extends substantially at right angles with respect to the vertical bore 13 and is also in communication therewith. As best shown in Figures 1 and 2, the milk conduits 15 are in communication with a plurality of tubes or flexible hoses 17. The hoses 17 extend upwardly for connection to the inflations of conventional teat cups (not shown). A tubular conduit or hose 17' of somewhat larger diameter is connected to the main milk conduit 16. The flexible hose 17' is in direct communication with a conventional type of milker pail, which need not be shown for the purposes of this invention.

The second body member 12 includes a pair of horizontally extending parallel conduits 19, which have connected thereto, and are in communication with, upwardly extending vacuum fittings 20. The vacuum fittings 20 are in turn connected to a plurality of teat cup tubes 21, which extend upwardly for connection with a set of conventional type teat cups (not shown). The horizontal extending conduits are in communication with a pair of pulsator tubes 22, said tubes being in communication at their ends with a pulsating device of the type generally used in milking systems.

The horizontally extending conduits 19 are connected at their ends to a downwardly extending tapered, or spool shaped, projecting member or plug 23. The projecting member 23 is provided at its upper and lower ends with annular tapering sealing surfaces 24 and 25. The projecting member 23 is also provided intermediate its ends with a substantially annular undercut portion 26 providing a circular stem 27 connecting the tapering sealing surfaces 24 and 25. It can readily be seen that all portions of the stem 27 are rounded and a smooth surface is obtained without any sharp corners in which milk might collect.

The tapering bore 13 is adapted to receive the tapering plug or projecting member 23 in mating or interfitting relation as best shown in Figures 2 and 3. It can readily be seen therefore that a valve type relationship is effected between the bore 13 and the tapering plug 23. When the first and second body members 11 and 12 are brought together in this relation, the undercut portion 26 forms a substantially annular chamber 28 as best shown in the dotted line position of the member 23 in Figure 5. The annular chamber 28 is in communication with the milk conduits 15. In this position the tapering sealing surfaces 24 and 25 serve to seal the ends of the bore 13, thereby providing the enclosed chamber 28.

In view of the tapering relation of the plug or projecting member with respect to the bore 13, an effective sealing of the bore is obtained by wedging the body members 11 and 12 together. In order to keep the body members 11 and 12 in wedged interfitting or mating relation, a resilient locking means is provided. A boss 29 projects horizontally from the vertically extending central member 12. The boss 29 is provided with internal threads 30. A resilient vertical leaf spring 31 is adapted to be resiliently secured to the boss 29 by means of a ball pin element 32. The vertical leaf spring 31 is provided at its upper end with a bent over portion 33 having flared side portions 34. The bent over portion 33 is of arcuate shape and the flared sides serve to stiffen the same. A horizontally extending ledge 35 is provided on the second body member 12. This ledge 35 is suitably machined to provide an arcuate edge 36 adapted to receive the bent over portion 33 of the vertical leaf spring 31. In order to securely fasten the leaf spring 31 to the boss 29, the ball pin 32 is provided with a threaded end 37 which is adapted to engage the internal threads 30 of the boss 29. A washer 39 is positioned between the vertical leaf spring 31 and a hexagonal head 38 integrally formed with the ball pin 32.

In the position shown in Figures 1 and 2, the first and second body members 11 and 12 of the teat cup claw 10 are wedged together in unitary relation. The claw is used in this position during the milking operation. In view of the resilient clamping means afforded by the vertical leaf spring 31, the tapering projecting member 23 is securely wedged within the vertical bore 13 and sealing relationship is effected between said members.

Before dismantling the claw the operator first desires to make certain that no vacuum is left within the milk passages leading to the teat cups and the milker pail. It is desirable to destroy any vacuum therein in order that the teat cups may readily be removed without subjecting the teats to any unusual and possibly detrimental pull. In order to destroy any vacuum therefore the operator merely pushes the plug 23 vertically with respect to the bore 13 thereby unseating the sealing surfaces 24 and 25. Since the chamber 28 is thereupon exposed to the atmosphere, any vacuum that might be left within the milk passages is destroyed. The leaf spring thereupon serves to return the members to their wedged relationship and the claw is ready for the next milking operation.

After the milking process, it is desired to quickly dismantle the teat cup claw and thoroughly wash the same, thereby preventing the growth of bacteria. In order to accomplish quick separation of the body members, the operator merely rotates the body member 12 to disengage the ledge 35 from the leaf spring 31. The parts of the claw may then be quickly separated. It should be now noted that all of the entrances and exits of the milk passages are easily visible and a flexible cleaning brush can easily be passed therethrough. Since the bore 13 is open at either end, a brush may likewise be passed therethrough and no sharp corners are present wherein milk residue could gather and thus form possible points of contamination. The tapered projecting member 23 can easily be cleaned in view of the undercut portions 26 which have rounded edges from which the milk residue can be removed. It can be seen that by virtue of the spool shaped construction of the tapered projection, no sharp surfaces or corners are provided which might provide collecting places for milk bacteria.

In view of the tapering bore and the tapering projection of the first and second body members, an effective wedged type sealing action is present between said members, thereby dispensing with the utilization of packing elements or flexible seals, which are undesirable from a sanitary standpoint.

It is to be noted therefore that an efficient and sanitary two piece milker claw is provided which can quickly and efficiently be taken apart for cleaning purposes. The objects of the invention therefor have been fully achieved by applicant's novel construction.

It is to be understood that modifications may be made in this construction which do not depart from the spirit of the invention nor the scope thereof as defined in the appended claims.

What is claimed is:

1. A coupling device for a plurality of tubes comprising a first body member having a plurality of conduits, said first body member having a tapered bore extending therethrough thereby providing a conical inner wall, a second body member having fittings connected thereto, and a tapering spool shaped portion projecting from said second body member, said spool shaped portion being adapted to engage said bore in mating relation, the ends of said spool shaped portion abutting said inner wall thereby providing a sealed chamber in communication with said conduits, said spool shaped member and said second body member being axially movable in said bore as a unitary structure for exposing the chamber to the atmosphere.

2. A coupling device for a plurality of tubes comprising a first body member having a plurality of conduits, said first body member having a tapered bore extending therethrough thereby providing a conical inner wall, a second body member having fittings connected thereto, a tapering spool shaped portion projecting from said second body member, said spool shaped portion being adapted to engage said bore in mating relation, the ends of said spool shaped portion abutting said inner wall thereby providing a sealed chamber in communication with said conduits, said spool shaped portion within said chamber being rounded and providing a smooth uninterrupted circular surface, said spool shaped member and said second body member being axially movable in said bore as a unitary structure for exposing the chamber to the atmosphere, and a locking means between said first and second body members for retaining said spool shaped member in mating relation with said bore.

3. A coupling device for a plurality of tubes comprising a first body member having a tapered bore extending therethrough, a plurality of conduits connected to said first body member, a second body member having a plurality of fittings connected thereto, and a tapering spool shaped projection on said second body member, said bore being adapted to receive said projection in mating relation, said bore and the ends of said projection thereby providing an enclosed chamber in communication with said conduits, and a resilient member connected to one of said body members and engaging a portion of the other body member for retaining said projection and said bore in wedged interfitting relation.

4. A teat cup claw comprising a first body member having a tapered bore extending therethrough thereby providing a conical inner wall, a plurality of conduits extending outwardly from said body member, said conduits being in communication with openings formed in said wall, a second body member having a plurality of fittings connected thereto, a tapered plug projecting from and connected to said second body member, said bore being adapted to receive said plug in mating relation, said plug being undercut intermediate its ends and providing upper and lower annular end portions adapted to engage the bore to provide a sealed annular chamber, and resilient means engaging said body members for retaining the plug in mating relation with the bore, said plug being movable with said second body member axially with respect to the bore for exposing the annular chamber to the atmosphere.

5. A teat cup claw comprising a first body member having a tapered bore extending therethrough thereby providing a conical inner wall, a plurality of conduits extending outwardly from said body, said conduits being in communication with openings formed in said wall, a second body member having a plurality of fittings connected thereto, a tapered plug projecting from said second body member, said bore being adapted to receive said plug in mating relation, said plug having a recessed portion intermediate its ends thereby providing a substantially uninterrupted annular chamber within said bore, annular portions on the ends of said plug adapted to engage said conical inner wall for sealing the ends of said bore, said tapered plug and said second body member being axially movable in said bore as a unitary structure for exposing the chamber to the atmosphere, and locking means connecting said first and second body members for retaining said plug and said bore in mating relation.

WILLIAM H. HARSTICK.

REFERENCES CITED

The following references are of record in the file of this patent:

UNITED STATES PATENTS

| Number | Name | Date |
| --- | --- | --- |
| 1,479,014 | Stampen | Jan. 1, 1924 |
| 1,583,580 | Dinesen | May 4, 1926 |
| 2,136,956 | Schmitt | Nov. 15, 1938 |

FOREIGN PATENTS

| Number | Country | Date |
| --- | --- | --- |
| 16,068 | Australia | Feb. 22, 1935 |
| 557,996 | Great Britain | Dec. 14, 1943 |